United States Patent
Chen

(10) Patent No.: US 10,019,087 B2
(45) Date of Patent: Jul. 10, 2018

(54) TOUCH INPUT METHOD AND APPARATUS

(71) Applicant: Huawei Device (Dongguan) Co., Ltd., Dongguan (CN)

(72) Inventor: Lei Chen, Beijing (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 150 days.

(21) Appl. No.: 14/980,586

(22) Filed: Dec. 28, 2015

(65) Prior Publication Data

US 2016/0110002 A1 Apr. 21, 2016

Related U.S. Application Data

(63) Continuation of application No. PCT/CN2014/090262, filed on Nov. 4, 2014.

(30) Foreign Application Priority Data

Nov. 8, 2013 (CN) .......................... 2013 1 0557225

(51) Int. Cl.
  *G06F 3/041* (2006.01)
  *G09G 3/36* (2006.01)
  (Continued)

(52) U.S. Cl.
  CPC ............ *G06F 3/0412* (2013.01); *G06F 3/041* (2013.01); *G06F 3/0416* (2013.01);
  (Continued)

(58) Field of Classification Search
  CPC ...... G06F 3/041; G06F 3/0412; G06F 3/0354; G09G 3/36; G09G 2360/18; G09G 2360/12; G09G 2320/0252
  See application file for complete search history.

(56) References Cited

U.S. PATENT DOCUMENTS

2007/0236432 A1* 10/2007 Benjamin ............ G09G 3/3648
  345/87
2013/0082962 A1* 4/2013 Jo .......................... G06F 3/0416
  345/173

(Continued)

FOREIGN PATENT DOCUMENTS

| CN | 103034362 A | 4/2013 |
| CN | 103064554 A | 4/2013 |
| CN | 103744550 A | 4/2014 |

OTHER PUBLICATIONS

Partial English Translation and Abstract of Chinese Patent Application No. CN103744550, Dec. 9, 2015, 10 pages.

(Continued)

*Primary Examiner* — Christopher E Leiby
(74) *Attorney, Agent, or Firm* — Conley Rose, P.C.

(57) ABSTRACT

A touch input method includes reading an $(N-1)^{th}$ piece of display information from a memory, where N is an integer greater than or equal to 2; acquiring an $N^{th}$ piece of coordinate information in an $N^{th}$ coordinate acquiring period, where the coordinate information is used to indicate location information, of a user touch, sensed by a touch component, and the coordinate acquiring period is less than a refresh period of a display component; generating, using the $(N-1)^{th}$ piece of display information and the $N^{th}$ piece of coordinate information, an $N^{th}$ piece of display information corresponding to the $N^{th}$ coordinate acquiring period, and storing the $N^{th}$ piece of display information in the memory; and when the display component is refreshed, displaying, using the display component, latest display information stored in the memory.

18 Claims, 7 Drawing Sheets

(51) Int. Cl.
  *G06F 3/0488* (2013.01)
  *G06F 3/0354* (2013.01)
(52) U.S. Cl.
  CPC .......... *G06F 3/04883* (2013.01); *G09G 3/36* (2013.01); *G06F 3/0354* (2013.01); *G09G 2320/0252* (2013.01); *G09G 2360/12* (2013.01); *G09G 2360/18* (2013.01)

(56) References Cited

U.S. PATENT DOCUMENTS

| | | | |
|---|---|---|---|
| 2013/0207915 A1 | 8/2013 | Asai et al. | |
| 2013/0314360 A1* | 11/2013 | Saitoh .................. | G06F 3/0412 345/173 |
| 2013/0342500 A1* | 12/2013 | Huang .................. | G06F 3/0416 345/174 |
| 2014/0118399 A1* | 5/2014 | Todorovich ........... | G06T 3/4038 345/634 |
| 2015/0116263 A1* | 4/2015 | Kim ........................ | G06F 3/044 345/174 |

OTHER PUBLICATIONS

Foreign Communication From a Counterpart Application, Chinese Application No. 201310557225.2, Chinese Office Action dated Feb. 3, 2016, 5 pages.
Foreign Communication From a Counterpart Application, PCT Application No. PCT/CN2014/090262, English Translation of International Search Report dated Feb. 4, 2015, 2 pages.
Foreign Communication From a Counterpart Application, PCT Application No. PCT/CN2014/090262, Written Opinion dated Feb. 4, 2015, 6 pages.

\* cited by examiner

Image corresponding to image information 1

Image corresponding to image information 2

Image corresponding to image information 3

TOUCH INPUT METHOD AND APPARATUS

CROSS-REFERENCE TO RELATED APPLICATIONS

This application is a continuation of International Application No. PCT/CN2014/090262, filed on Nov. 4, 2014, which claims priority to Chinese Patent Application No. 201310557225.2, filed on Nov. 8, 2013, both of which are hereby incorporated by reference in their entireties.

TECHNICAL FIELD

The present disclosure relates to the field of electronic information technologies, and in particular, to a touch input method and apparatus.

BACKGROUND

With development of touch-sensitive technologies, touch components are widely used in terminal devices such as a smartphone, a digital graphics tablet, and an all-in-one machine. When processing a touch event such as sliding or drawing, a related processing program is limited by a refresh capability of a liquid crystal display (LCD). For example, a report rate of a touch component is 120 hertz (Hz), and a refresh frequency of the LCD is 60 Hz, and then touch processing for sliding or drawing is performed according to a smaller value between the report rate of the touch component and the refresh frequency of the LCD. Therefore, the touch event is processed according to 60 Hz, and two points need to be processed each time. A general processing manner is discarding one point, and processing only the other point; or calculating an average value of the two points for processing.

In the prior art, to improve accuracy of capturing track information input by a user, a report rate of a touch component is usually increased. However, in a sliding or drawing process, track information input by a user using a touch component needs to be continually displayed on an LCD to meet a requirement on the accuracy when the user draws on a terminal device using a touch input device. Currently, a refresh frequency of an LCD has already reached 60 Hz or 75 Hz, and it is unnecessary to make any improvement from the perspective of recognition by human eyes. Therefore, in a case in which a refresh frequency of the LCD is lower than a report rate of the touch component, the accuracy of user drawing is still limited by the refresh frequency of the LCD, some information input by the user is lost when the display component is refreshed, and the accuracy of drawing a track using the terminal device is reduced.

SUMMARY

Embodiments of the present disclosure provide a touch input method and apparatus, which can improve drawing accuracy.

To achieve the foregoing objective, the following technical solutions are used in the embodiments of the present disclosure.

According to a first aspect, an embodiment of the present disclosure provides a touch input method, applied to a terminal device, where the terminal device includes at least a touch component, a display component, and a memory, and the method includes reading an $(N-1)^{th}$ piece of display information from the memory, where N is an integer greater than or equal to 2; acquiring an $N^{th}$ piece of coordinate information in an $N^{th}$ coordinate acquiring period, where the coordinate information is used to indicate location information, of a user touch, sensed by the touch component, and the coordinate acquiring period is less than a refresh period of the display component; generating, using the $(N-1)^{th}$ piece of display information and the $N^{th}$ piece of coordinate information, an $N^{th}$ piece of display information corresponding to the $N^{th}$ coordinate acquiring period, and storing the $N^{th}$ piece of display information in the memory; and when the display component is refreshed, displaying, using the display component, latest display information stored in the memory.

With reference to the first aspect, in a first possible implementation manner of the first aspect, the $(N-1)^{th}$ piece of display information is a set of a first piece of coordinate information to an $(N-1)^{th}$ piece of coordinate information, and the $N^{th}$ piece of display information is a set of the first piece of coordinate information to the $N^{th}$ piece of coordinate information; the generating, using the $(N-1)^{th}$ piece of display information and the $N^{th}$ piece of coordinate information, an $N^{th}$ piece of display information corresponding to the $N^{th}$ coordinate acquiring period includes generating the set of the first piece of coordinate information to the $N^{th}$ piece of coordinate information using the $N^{th}$ piece of coordinate information and the set of the first piece of coordinate information to the $(N-1)^{th}$ piece of coordinate information; and the displaying, using the display component, latest display information stored in the memory includes generating image information according to a set of latest coordinate information stored in the memory, and displaying the image information using the display component.

With reference to the first aspect, in a second possible implementation manner of the first aspect, the $(N-1)^{th}$ piece of display information is an $(N-1)^{th}$ piece of image information, and the $N^{th}$ piece of display information is an $N^{th}$ piece of image information; the generating, using the $(N-1)^{th}$ piece of display information and the $N^{th}$ piece of coordinate information, an $N^{th}$ piece of display information corresponding to the $N^{th}$ coordinate acquiring period, and storing the $N^{th}$ piece of display information in the memory includes generating the $N^{th}$ piece of image information using the $(N-1)^{th}$ piece of image information and the $N^{th}$ piece of coordinate information; and the displaying, using the display component, latest display information stored in the memory includes displaying, using the display component, latest image information stored in the memory.

With reference to the first aspect and the first and the second possible implementation manners of the first aspect, in a third possible implementation manner of the first aspect, the storing the $N^{th}$ piece of display information in the memory includes storing the $N^{th}$ piece of display information and time information corresponding to the $N^{th}$ piece of display information in the memory; and the displaying, using the display component, latest display information stored in the memory includes acquiring, according to the time information, the latest display information stored in the memory, and displaying, using the display component, the latest display information stored in the memory.

With reference to the first aspect and the first to the third possible implementation manners of the first aspect, in a fourth possible implementation manner of the first aspect, the coordinate acquiring period is a report period of the touch component, the coordinate information is sensing information reported by the touch component, and the acquiring an $N^{th}$ piece of coordinate information in an $N^{th}$ coordinate acquiring period includes acquiring sensing information N that is reported by the touch component in an $N^{th}$ report period.

With reference to the first aspect and the first to the third possible implementation manners of the first aspect, in a fifth possible implementation manner of the first aspect, the coordinate acquiring period is a sampling period in which sensing information reported by the touch component is sampled, the coordinate information is sample information obtained by sampling the sensing information reported by the touch component, and the acquiring an $N^{th}$ piece of coordinate information in an $N^{th}$ coordinate acquiring period includes acquiring an $N^{th}$ piece of sample information in an $N^{th}$ sampling period according to sensing information reported by the touch component.

With reference to the fifth possible implementation manner of the first aspect, in a sixth possible implementation manner of the first aspect, the refresh period of the display component is an integer multiple of the sampling period.

According to a second aspect, an embodiment of the present disclosure provides a touch input apparatus, where the apparatus includes a display information acquiring unit configured to read an $(N-1)^{th}$ piece of display information from a memory, where N is an integer greater than or equal to 2; a coordinate information acquiring unit configured to acquire an $N^{th}$ piece of coordinate information in an $N^{th}$ coordinate acquiring period, where the coordinate information is used to indicate location information, of a user touch, sensed by a touch component, and the coordinate acquiring period is less than a refresh period of a display component; a display information generating unit configured to generate, using the $(N-1)^{th}$ piece of display information and the $N^{th}$ piece of coordinate information, an $N^{th}$ piece of display information corresponding to the $N^{th}$ coordinate acquiring period; a storage unit configured to store the $N^{th}$ piece of display information in the memory; and a display unit configured to, when the display component is refreshed, display, using the display component, latest display information stored in the memory.

With reference to the second aspect, in a first possible implementation manner of the second aspect, the $(N-1)^{th}$ piece of display information is a set of a first piece of coordinate information to an $(N-1)^{th}$ piece of coordinate information, and the $N^{th}$ piece of display information is a set of the first piece of coordinate information to the $N^{th}$ piece of coordinate information; the display information generating unit is configured to generate the set of the first piece of coordinate information to the $N^{th}$ piece of coordinate information using the $N^{th}$ piece of coordinate information and the set of the first piece of coordinate information to the $(N-1)^{th}$ piece of coordinate information; and the display unit is configured to generate image information according to a set of latest coordinate information stored in the memory, and display the image information using the display component.

With reference to the second aspect, in a second possible implementation manner of the second aspect, the $(N-1)^{th}$ piece of display information is an $(N-1)^{th}$ piece of image information, and the $N^{th}$ piece of display information is an $N^{th}$ piece of image information; the display information generating unit is configured to generate the $N^{th}$ piece of image information using the $(N-1)^{th}$ piece of image information and the $N^{th}$ piece of coordinate information; and the display unit is configured to display, using the display component, latest image information stored in the memory.

With reference to the second aspect and the first and the second possible implementation manners of the second aspect, in a third possible implementation manner of the second aspect, the storage unit is configured to store the $N^{th}$ piece of display information and time information corresponding to the $N^{th}$ piece of display information in the memory; and the display unit is configured to acquire, according to the time information, the latest display information stored in the memory, and display, using the display component, the latest display information stored in the memory.

With reference to the second aspect and the first to the third possible implementation manners of the second aspect, in a fourth possible implementation manner of the second aspect, the coordinate acquiring period is a report period of the touch component, the coordinate information is sensing information reported by the touch component, and the coordinate information acquiring unit is configured to acquire sensing information N that is reported by the touch component in an $N^{th}$ report period.

With reference to the second aspect and the first to the third possible implementation manners of the second aspect, in a fifth possible implementation manner of the second aspect, the coordinate acquiring period is a sampling period in which sensing information reported by the touch component is sampled, the coordinate information is sample information obtained by sampling the sensing information reported by the touch component, and the coordinate information acquiring unit is configured to acquire an $N^{th}$ piece of sample information in an $N^{th}$ sampling period according to sensing information reported by the touch component.

With reference to the fifth possible implementation manner of the second aspect, in a sixth possible implementation manner of the second aspect, the refresh period of the display component is an integer multiple of the sampling period.

In the touch input method and apparatus provided in the embodiments of the present disclosure, all sensing information reported by a touch component can be used, and corresponding image information is generated using all the sensing information and is stored, such that the generated image information can reflect the sensing information actually reported by the touch component, and when each refresh period of a display component begins, latest stored image information is displayed. This avoids the following problem in the prior art: an error exists in a track actually input by a user because sensing information in a refresh period is selected randomly, thereby improving accuracy of touch input. Alternatively, sensing information can be sampled at a frequency higher than a refresh frequency of a display component, such that the sensing information is used as much as possible, and therefore an obtained track is closer to an actual touch track.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

An embodiment of the present disclosure provides a touch input method, which may be applied to a terminal device, where the terminal device includes at least components such as a touch component, a display component, a processor, and a memory, and the components in the terminal device may be connected by a bus. The touch component is configured to generate sensing information, the touch component reports the sensing information according to a specified report period, and sensing information reported by the touch component in a report period is used to indicate a location of a contact point when a user performs a touch operation on the touch component, where the report period=1/a report rate. For example, in a terminal device such as a smartphone or a tablet computer, a touch component may be a touchscreen. The touchscreen can capture a track when a user slides or taps on the touchscreen using a finger or a stylus, and use the captured track as sensing information and transmit the sensing information to a processor of the terminal device, thereby implementing a process in which the user inputs information to the terminal device using the touchscreen.

Figure 1:
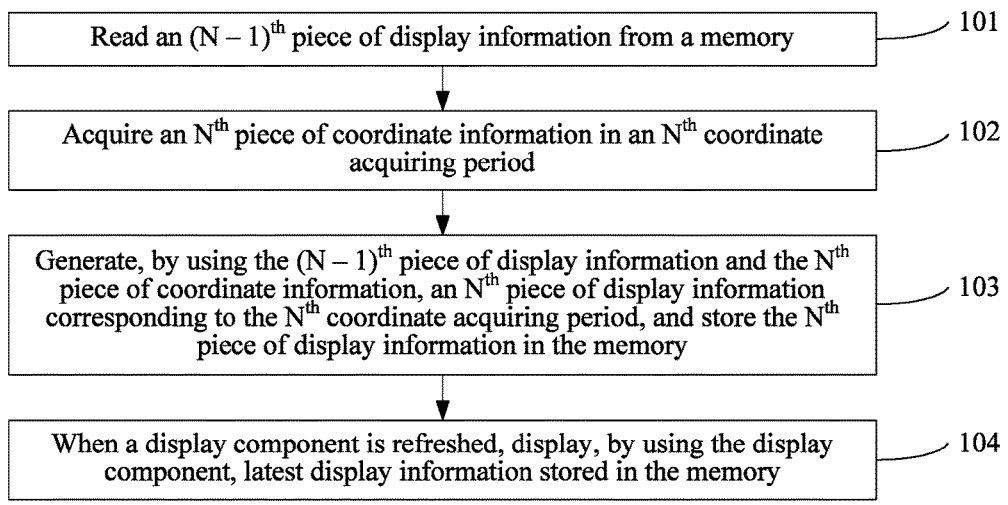
FIG. 1 is a flowchart of a touch input method according to an embodiment of the present disclosure.

As shown in FIG. 1, an embodiment of the present disclosure provides a touch input method, including the following steps.

101. Read an $(N-1)^{th}$ piece of display information from a memory, where N is an integer greater than or equal to 2.

A first piece of display information is generated according to a first piece of coordinate information, and may be the first piece of coordinate information, or image information generated using the first piece of coordinate information. The first piece of coordinate information is acquired in a first coordinate acquiring period, and the coordinate information is used to indicate location information, of a user touch, sensed by a touch component. The $(N-1)^{th}$ piece of display information read from the memory may be a set of the first piece of coordinate information to an $(N-1)^{th}$ piece of coordinate information, or may be an $(N-1)^{th}$ piece of image information generated using the first piece of coordinate information to an $(N-1)^{th}$ piece of coordinate information.

102. Acquire an $N^{th}$ piece of coordinate information in an $N^{th}$ coordinate acquiring period, where the coordinate information is used to indicate location information, of a user touch, sensed by a touch component, and the coordinate acquiring period is less than a refresh period of a display component.

The coordinate acquiring period may be a report period of the touch component, or may be a sampling period in which sensing information reported by the touch component is sampled. Correspondingly, the coordinate information may be the sensing information reported by the touch component, or sample information obtained by sampling the sensing information reported by the touch component.

103. Generate, using the $(N-1)^{th}$ piece of display information and the $N^{th}$ piece of coordinate information, an $N^{th}$ piece of display information corresponding to the $N^{th}$ coordinate acquiring period, and store the $N^{th}$ piece of display information in the memory.

More specifically, it may be that a set of the first piece of coordinate information to the $N^{th}$ piece of coordinate information is generated using the $N^{th}$ piece of coordinate information and the set of the first piece of coordinate information to the $(N-1)^{th}$ piece of coordinate information; or it may be that an $N^{th}$ piece of image information is generated using the $(N-1)^{th}$ piece of image information and the $N^{th}$ piece of coordinate information. It may also be that an $N^{th}$ piece of image information is generated using the $N^{th}$ piece of coordinate information and the set of the first piece of coordinate information to the $(N-1)^{th}$ piece of coordinate information.

During storage, a set of coordinate information may be stored using an array or the like. Further, the $N^{th}$ piece of display information and time information corresponding to the $N^{th}$ piece of display information may be stored in the memory.

104. When the display component is refreshed, display, using the display component, latest display information stored in the memory.

If the display information is a set of coordinate information, image information is generated according to a set of latest coordinate information stored in the memory, and the image information is displayed using the display component.

If the display information is image information, latest image information stored in the memory is displayed using the display component.

It may be that the latest display information stored in the memory is acquired according to the time information, and the latest display information stored in the memory is displayed using the display component.

There is no order between steps 101 and 102 during actual implementation. Step 101 may be first performed, or step 102 may be first performed, or steps 101 and 102 are performed simultaneously, which is not limited in this embodiment of the present disclosure.

Therefore, in the touch input method provided in this embodiment of the present disclosure, touch-related coordinate information can be used at a frequency higher than a refresh frequency of the display component, and therefore, an obtained track is closer to an actual touch track.

Figure 2:
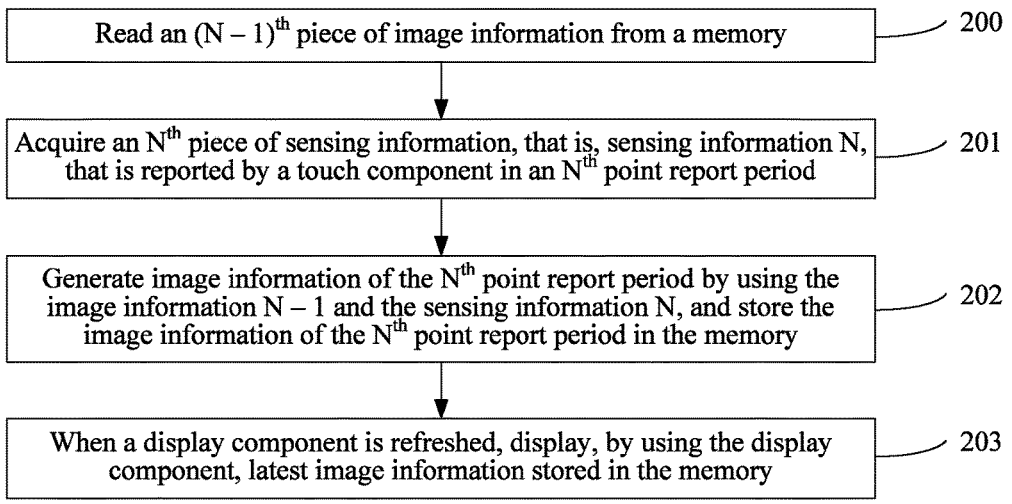
FIG. 2 is a flowchart of another touch input method according to an embodiment of the present disclosure.

During implementation, the coordinate acquiring period may be a report period of the touch component, and the coordinate information is the sensing information reported by the touch component. As shown in FIG. 2, a touch input method provided in an embodiment of the present disclosure may include the following steps.

200. Read an $(N-1)^{th}$ piece of image information from a memory, where N is an integer greater than or equal to 2.

201. Acquire an $N^{th}$ piece of sensing information, i.e., sensing information N, that is reported by a touch component in an $N^{th}$ report period.

The sensing information N is used to indicate location information of a user touch sensed by the touch component and reported in the $N^{th}$ report period.

Figure 3:
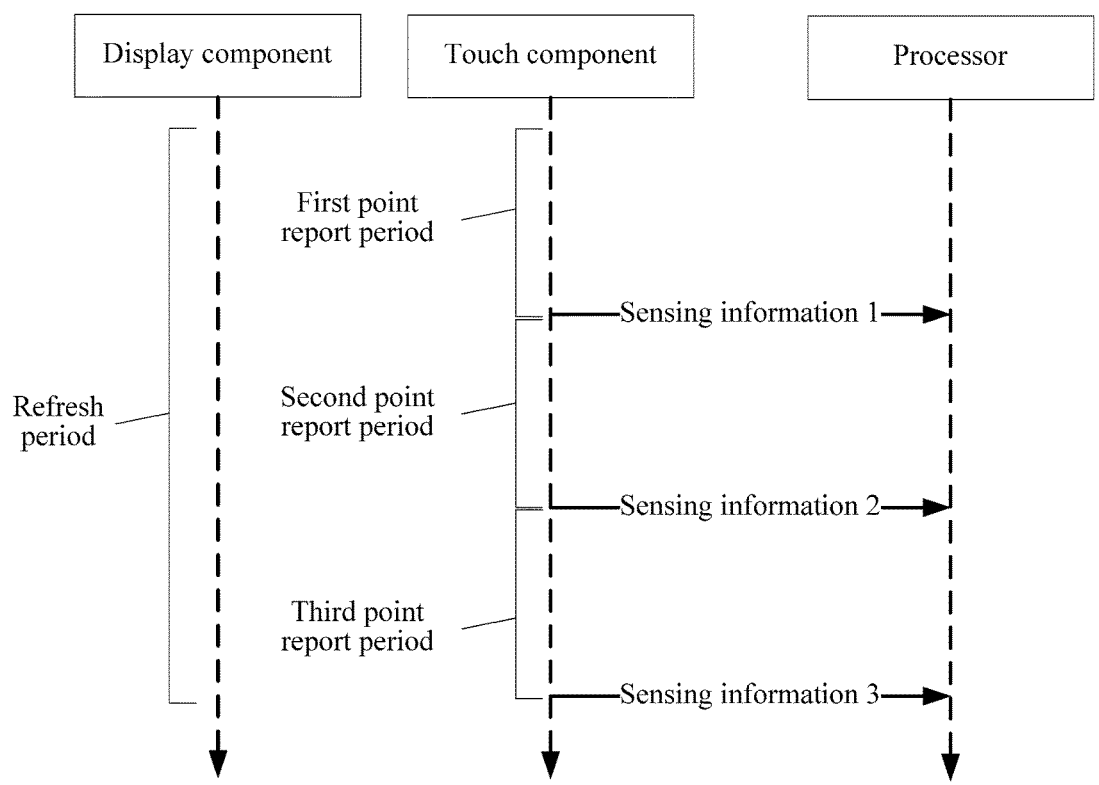
FIG. 3, FIG. 4, and FIG. 5 are schematic diagrams of examples according to an embodiment of the present disclosure.

FIG. 3 schematically shows that a report period is synchronous with a refresh period, and the refresh period is three times the report period. A moment at which a touch component detects a touch is used as a start time of a first report period, and the touch component may execute in the first report period, a second report period, a third report period, . . . , and an $N^{th}$ report period. The touch component may successively report sensing information 1, sensing information 2, sensing information 3, . . . , and sensing information N to a processor in a terminal device, where the sensing information 1 is reported by the touch component in the first report period, the sensing information 2 is reported by the touch component in the second report period, the sensing information 3 is reported by the touch component in the third report period, . . . , and the sensing information N is reported by the touch component in the $N^{th}$ report period.

It should be noted that, when a user ends a touch input operation and performs another touch input operation, a moment at which the touch component generates sensing information according to the other touch of the user on the touch component may be used as a start time of a new first report period.

202. Generate image information of the $N^{th}$ report period using the image information N−1 and the sensing information N, and store the image information of the $N^{th}$ report period in the memory.

Figure 5:
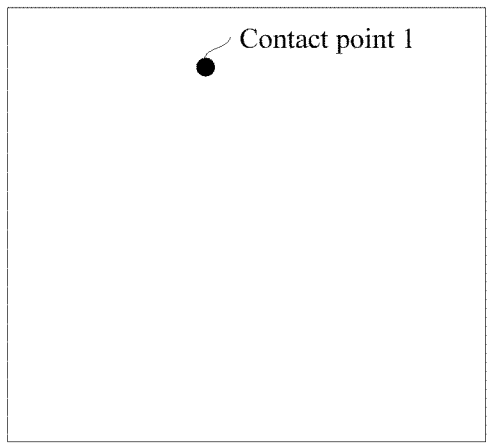
Figure 5:
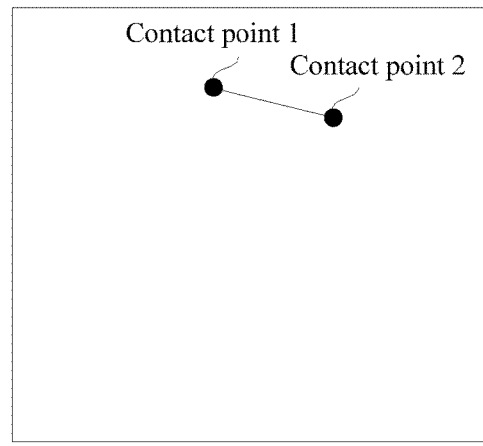
Figure 5:
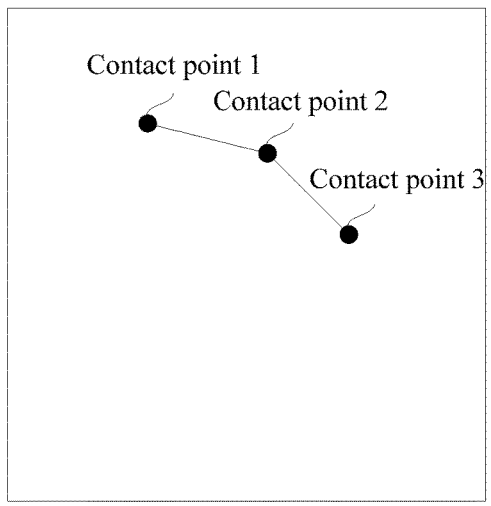

In this embodiment, assuming that a report rate of the touch component is 180 Hz, and a refresh frequency of a display component is 60 Hz, if a start time of one refresh period of the display is the same as the start time of the first report period of the touch component, in one refresh period of the display component, the touch component executes three report periods: the first report period, the second report period, and the third report period. The terminal device may generate, using the sensing information 1 reported by the touch component, image information 1 corresponding to the first report period, and store the image information 1 in the memory; the terminal device may generate, using the image information 1 and sensing information 2, image information 2 corresponding to the second report period, and store the image information 2 in the memory; and the terminal device may generate, using the image information 2 and sensing information 3, image information 3 corresponding to the third report period, and store the image information 3 in the memory. The terminal device receives, in the first report period of the touch component, the sensing information 1 reported by the touch component, where the sensing information 1 is used to obtain a contact point 1, and as shown in FIG. 5, the terminal device may display an image including the contact point 1 using the image information 1 generated using the sensing information 1. The terminal device receives, in the second report period of the touch component, the sensing information 2 reported by the touch component, where the sensing information 2 is used to obtain a contact point 2, and as shown in FIG. 5, the terminal device may display an image including the contact point 1 and the contact point 2 using the image information 1 and the image information 2 that is generated using the sensing information 2. The terminal device receives, in the third report period of the touch component, the sensing information 3 reported by the touch component, where the sensing information 3 is used to obtain a contact point 3, and as shown in FIG. 5, the terminal device may display an image including the contact point 1, the contact point 2, and the contact point 3 using the image information 2 and the image information 3 that is generated using the sensing information 3. Further, after the third report period of the touch component is executed, the terminal device may acquire the image information 3 from the memory, and refresh an image on the display component using the image information 3, such that when refreshing the image, the display component can display the image including all of the contact point 1, the contact point 2, and the contact point 3.

More specifically, multiple frame buffers may be set in the memory, and the generated image information is stored in the multiple frame buffers. Generally, a quantity of frame buffers may be set to 2*(the report rate of the touch component/a refresh frequency of an LCD), and if a quotient of the report rate of the touch component/the refresh frequency of the LCD is not an integer, the quantity of frame buffers may be set to 2*(a value obtained by rounding the report rate of the touch component/the refresh frequency of the LCD+1). The generated image information may be cyclically stored in the frame buffers. For example, when the quantity of frame buffers is set to 6, the image information 1 is stored in a frame buffer 1, the image information 2 is stored in a frame buffer 2, . . . , image information 6 is stored in a frame buffer 6, image information 7 is stored in the frame buffer 1, image information 8 is stored in the frame buffer 2, and so on.

It should be noted that, after the user ends a touch input operation, the user may clear image information stored in the memory or clear the frame buffers. When the user performs another touch input operation, a moment at which the touch component generates sensing information according to the other touch of the user on the touch component may be used as a start time of a new first report period. When no touch input operation of the user is received within a specified time, it may be determined that the user ends a current touch input operation. When the terminal device stores image information, time information is also stored. For example, an actual time at which the image information is generated or an actual time at which the image information is stored is stored together with the image information, or when the image information is stored in a first frame buffer, a latest identifier may be used to mark the first frame buffer as the latest, and when a next piece of image information is stored in a second frame buffer, the second frame buffer may be marked as the latest, and the latest identifier of the first frame buffer is removed. There may be many manners that enable the terminal device to learn which piece of image information is the latest stored.

In this embodiment, the terminal device can store, in a drawing manner, all sensing information reported by the touch component, and then send the sensing information to the display for display; therefore, a touch track of the user can be displayed more accurately.

203. When a display component is refreshed, display, using the display component, latest image information stored in the memory.

Image information stored in the memory at a last time may be displayed using the display component. For example, the report rate of the touch component is 300 Hz, the refresh frequency of the display component is 75 Hz, and the memory includes a total of 8 frame buffers (FBs) including FB0 to FB7. If a first refresh period of the display component is synchronous with a first report period of the touch component, when the display component completes a first refresh, the touch component executes a total of four report periods, including the first report period, a second report period, a third report period and a fourth report period. Sensing information generated by the touch component in the first report period to the fourth report period is sensing information A, sensing information B, sensing information C, and sensing information D respectively. After acquiring the sensing information A in the first report period, the terminal device may generate image information 1 using the sensing information A, and store the image information 1 in FB0. After acquiring the sensing information B in the second report period, the terminal device may generate image information 2 using the image information A and the sensing information B, and store the image information 2 in FB1. After acquiring the sensing information C in the third report period, the terminal device may generate image information 3 using the image information 2 and the sensing information C, and store the image information 3 in FB2. After acquiring the sensing information D in the fourth report period, the terminal device may generate image information 4 using the image information 3 and the sensing information D, and store the image information 4 in FB3. When a second refresh period begins, the display component reads the image information 4 from FB3 for display. Meanwhile, the touch component continues to report sensing information, and the terminal device continues to store generated image information in FB4 to FB7.

As described above, when the terminal device stores image information, time information is also stored. Therefore, when the display component enters a new refresh period, the terminal device may acquire latest stored image information according to the time information and send the image information to the display component for display.

It should be noted that, an example in which a refresh period of the display component is an integer multiple of a report period of the touch component, and the refresh period of the display component is synchronous with the report period of the touch component is used in the foregoing description. However, in practice, the refresh period of the display component may not be an integer multiple of the report period of the touch component, and the refresh period of the display component may not be synchronous with the report period of the touch component, which does not affect implementation of this embodiment of the present disclosure. The terminal device generates image information using each piece of sensing information reported by the touch component and stores the image information, and when the display component begins to be refreshed, the terminal device sends latest stored image information to the display component for display.

Figure 4:
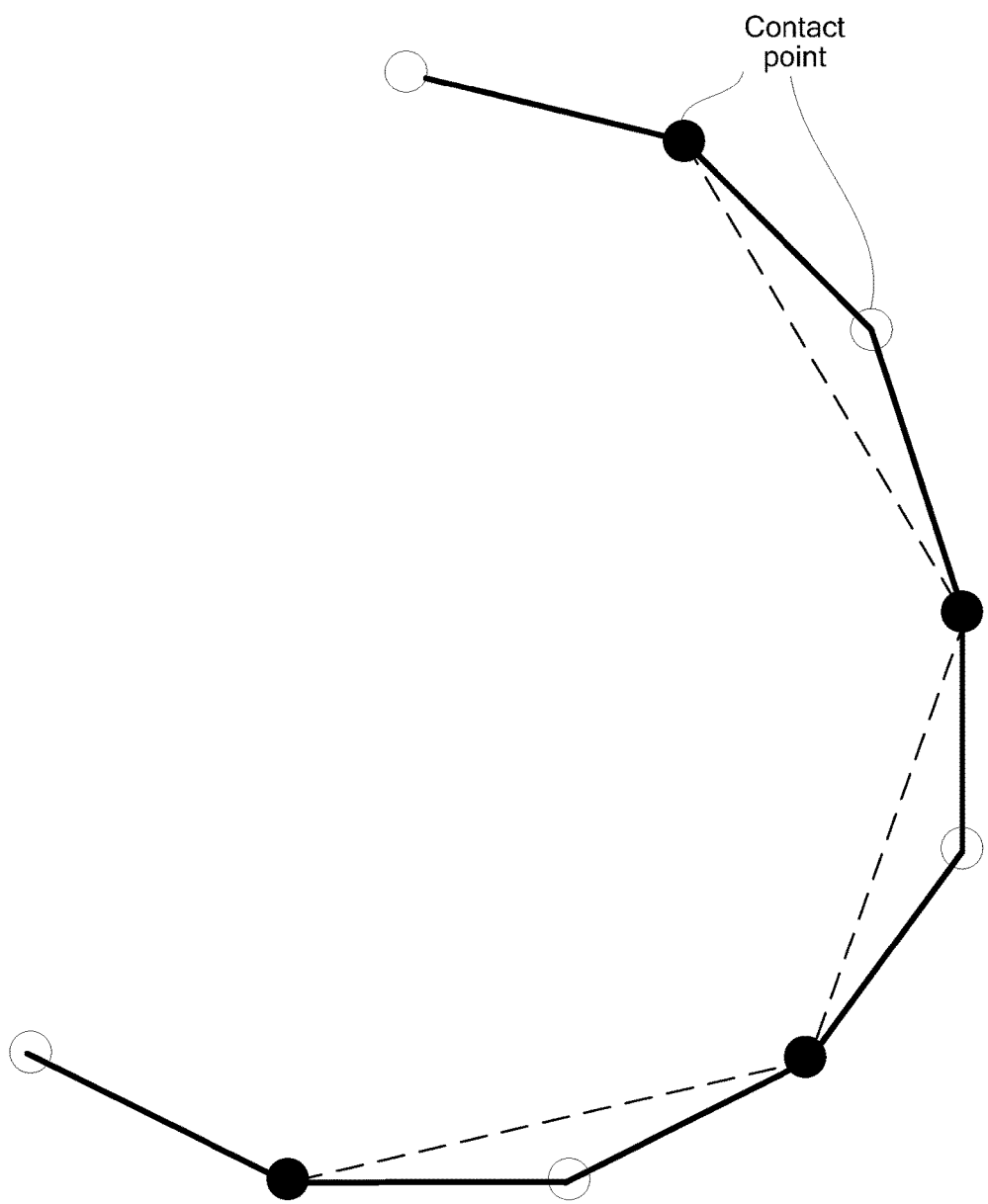

For example, touch components on currently used terminal devices are mostly touchscreens, and when a user draws an arc on a touchscreen, used as a touch component, of a terminal device using a finger, the touchscreen may report to a processor of the terminal device, in each report period, one piece of sensing information used to indicate a current contact point of the finger on the touchscreen. However, in actual application, the user usually continually performs a slide operation within multiple report periods on the touchscreen. To acquire and use all sensing information reported by the touchscreen when the user performs the slide operation, the terminal device draws an image using all the sensing information and stores the image, and during display, displays a latest generated image. In this way, sensing information reported in a refresh process of the display component is not discarded, thereby ensuring that an image processing program in the terminal device can use sensing information as a slide track of the user as much as possible. However, in the prior art except the present disclosure, as shown in FIG. 4, some sensing information in a previous refresh period is selected for display, only sensing information corresponding to solid contact points can be displayed, and sensing information corresponding to hollow contact points can only be discarded, thereby causing distortion of image information (as shown by dashed lines); or one piece of coordinate information is obtained from multiple pieces of sensing information using an average value, which is quite different from actual sensing information.

There is no order between steps 200 and 201 during actual implementation. Step 200 may be first performed, or step 201 may be first performed, or steps 200 and 201 are performed simultaneously, which is not limited in this embodiment of the present disclosure.

Therefore, in the touch input method provided in this embodiment of the present disclosure, all sensing information reported by a touch component can be used, and corresponding image information is generated using all the sensing information and is stored, such that the generated image information can reflect the sensing information actually reported by the touch component, and when each refresh period of a display component begins, latest stored image information is displayed. This avoids the following problem in the prior art: an error exists in a track actually input by a user because sensing information in a refresh period is selected randomly, thereby improving accuracy of touch input.

Figure 6:
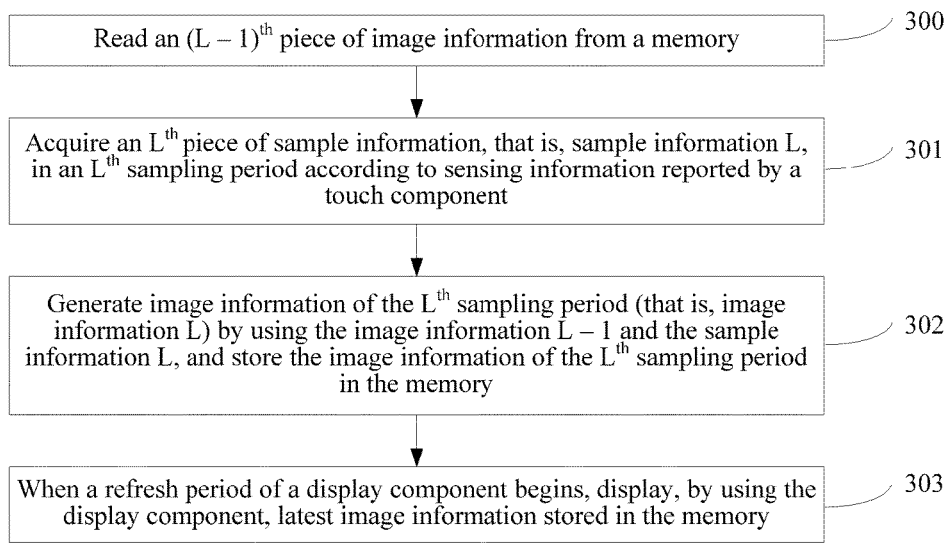
FIG. 6 is a flowchart of another touch input method according to an embodiment of the present disclosure.

The coordinate acquiring period may be a sampling period in which sensing information reported by the touch component is sampled, and the coordinate information may be sample information obtained by sampling the sensing information reported by the touch component. As shown in FIG. 6, a touch input method provided in an embodiment of the present disclosure may include the following steps.

300. Read an $(L-1)^{th}$ piece of image information from a memory, where L is an integer greater than or equal to 2.

301. Acquire an $L^{th}$ piece of sample information, namely, sample information L, in an $L^{th}$ sampling period according to sensing information reported by a touch component, where the sample information is used to indicate location information, of a user touch, sensed by the touch component.

In this embodiment, a processor of a terminal device may sample, according to a specified sampling period, sensing information generated by the touch component. The sampling period is less than a refresh period of a display component, and optionally, the refresh period of the display component may be an integer multiple of the sampling period. In this way, a relatively smooth track may be displayed. The sampling period=1/a sampling frequency, and the refresh period of the display component=1/a refresh frequency of the display component. Optionally, the refresh period of the display component may be an integer multiple of the sampling period; one refresh period of the display component may be synchronous with one sampling period, and during implementation, they may also not be synchronous.

The sampling period may be equal to a report period. When the sampling period is synchronous with the report period, the sample information obtained by means of sampling is sensing information reported in a corresponding report period.

It should be noted that, in an actual implementation process, the sampling period may not be equal to the report period, and the sampling period may not be synchronous with the report period. Therefore, during implementation of sampling, some existing algorithms may be used to estimate, according to received sensing information, sample information during sampling. For example, the sampling frequency is 120 Hz, the report rate is 120 Hz, and the sampling period is not synchronous with the report period. During sampling, previous two pieces of sensing information or more sensing information acquired during sampling may be used to estimate one piece of sample information.

A moment at which the touch component detects a touch may be used as a start time of a first sampling period, or a start time of a first refresh period of an LCD after the touch component detects a touch is used as a start time of a first sampling period. Herein, only the start time of the first sampling period is described using an example, and may be set according to a requirement. From the start time of the sampling period, the processor begins to execute one sampling period. It should be noted that, after a user ends a touch input operation and when the user performs another touch input operation, a moment at which the touch component generates sensing information according to the other touch of the user on the touch component may be used as a start time of a new first report period. When no touch input operation of the user is received within a specified time, it may be determined that the user ends a current touch input operation.

302. Generate image information of the $L^{th}$ sampling period (i.e., image information L) using the image information L=1 and the sample information L, and store the image information of the $L^{th}$ sampling period in the memory.

In this embodiment, the terminal device may sample, at a frequency higher than the refresh frequency of the display component, sensing information reported by the touch component, to obtain sample information, and generate image information using sample information obtained from a first period in which sampling begins to the end of a current sampling period, and store the image information in the memory, such that the display component displays the image information in the memory in a latest refresh period that begins to be executed.

For example, the report rate of the touch component is 180 Hz, and the refresh frequency of the display component is 60 Hz. If a start time of one refresh period of the display is the same as a start time of a report period of the touch component, in one refresh period of the display component, the touch component executes three report periods: a first report period, a second report period and a third report period. It is assumed that the processor of the terminal device uses a sampling period that is synchronous with and has a same period with the report period of the touch component. Therefore, in a first sampling period, sensing information 1 reported by the touch component may be used as sample information 1, and image information 1 corresponding to the first sampling period may be generated using the sample information 1 and stored in the memory. In a second sampling period of the touch component, the processor of the terminal device may use sensing information 2 reported by the touch component as sample information 2, and may generate, using the image information 1 and the sample information 2, image information 2 corresponding to the second sampling period, and store the image information 2 in the memory. In a third sampling period of the touch component, the processor of the terminal device may use sensing information 3 reported by the touch component and received by the processor as sample information 3, and may generate, using the image information 2 and the sample information 3, image information 3 corresponding to the third sampling period, and store the image information 3 in the memory. In this case, if the display component needs to refresh a screen, the latest generated image information 3 may be extracted from the memory, and displayed on the screen.

For example, the report rate of the touch component is 180 Hz, the refresh frequency of the display component is 60 Hz, and the sampling frequency is 120 Hz. If a start time of a refresh period of the display is the same as a start time of a report period of the touch component, and the start time of the refresh period of the display is the same as a start time of a sampling period, in one refresh period of the display component, the touch component executes three report periods: a first report period, a second report period, and a third report period, and two sampling periods are executed. It is assumed that a first refresh period, a first sampling period and the first report period are synchronous. The terminal device may obtain sample information 1 by means of estimation using sensing information 1 reported by the touch component, and may generate, using the sample information 1, image information 1 corresponding to the first sampling period, and store the image information 1 in the memory. The processor of the terminal device may use sensing information 3 reported by the touch component as sample information 2 (or may obtain sample information 2 by means of estimation according to sensing information 2 and sensing information 3 that are reported by the touch component), and may generate, using the image information 1 and the sample information 2, image information 2 corresponding to a second sampling period, and store the image information 2 in the memory. The processor of the terminal device may use the sensing information 3 and sensing information 4 that are reported by the touch component as sample information 3, and may generate, using the image information 2 and the sample information 3, image information 3 corresponding to a third sampling period, and store the image information 3 in the memory. In this case, if the display component needs to refresh the screen, the latest generated image information 3 may be extracted from the memory, and displayed on the screen.

More specifically, multiple frame buffers may be set in the memory, and the generated image information is stored in the multiple frame buffers. Generally, a quantity of frame buffers may be set to 2*(the sampling frequency/a refresh frequency of an LCD), and if a quotient of the sampling frequency/the refresh frequency of the LCD is not an integer, the quantity of frame buffers may be set to 2*(a value obtained by rounding the sampling frequency/the refresh frequency of the LCD+1). The generated image information may be cyclically stored in the frame buffers. For example, when the quantity of frame buffers is set to 6, the image information 1 is stored in a frame buffer 1, the image information 2 is stored in a frame buffer 2, . . . , image information 6 is stored in a frame buffer 6, image information 7 is stored in the frame buffer 1, image information 8 is stored in the frame buffer 2, and so on.

It should be noted that, after the user ends a touch input operation, the user may clear image information stored in the memory or clear the frame buffers.

When the terminal device stores image information, time information is also stored. For example, an actual time at which the image information is generated or an actual time at which the image information is stored is stored together with the image information, or when the image information is stored in a first frame buffer, a latest identifier may be used to mark the first frame buffer as the latest, and when a next piece of image information is stored in a second frame buffer, the second frame buffer may be marked as the latest, and the latest identifier of the first frame buffer is removed. There may be many manners that enable the terminal device to learn which piece of image information is the latest stored.

303. When a refresh period of a display component begins, display, using the display component, latest image information stored in the memory.

Image information stored in the memory at a last time may be displayed using the display component. For example, the report rate of the touch component is 300 Hz, the refresh frequency of the display component is 75 Hz, the sampling frequency is 75 Hz, and the memory includes a total of 8 frame buffers including FB0 to FB7. If a refresh period of the display component is synchronous with a sampling period, and the sampling period is synchronous with a report period, when the display component completes one refresh, four sampling periods are completed for sampling. The touch component executes a total of four report periods, including a first report period, a second report period, a third report period and a fourth report period. Sensing information generated by the touch component in the first report period to the fourth report period is sensing information A, sensing information B, sensing information C, and sensing information D respectively. Sample information obtained by means of sampling is sample information A, sample information B, sample information C, and sample information D respectively, corresponding to the sensing information A, the sensing information B, the sensing information C, and the sensing information D respectively. After acquiring the sensing information A in the first report period, the terminal device may generate image information 1 using the sensing information A, and store the image information 1 in FB0. After acquiring the sensing information B in the second report period, the terminal device may generate image information 2 using the image information 1 and the sensing information B, and store the image information 2 in FB1. After acquiring the sensing information C in the third report period, the terminal device may generate image information 3 using the image information 2 and the sensing information C, and store the image information 3 in FB2. After acquiring the sensing information D in the fourth report period, the terminal device may generate image information 4 using the image information 3 and the sensing information D, and store the image information 4 in FB3. When a new refresh period begins, the display component reads the image information 4 from FB3 for display. Meanwhile, the touch component continues to report sensing information, and the processor continues to sample and store generated image information in FB4 to FB7. When a next refresh period begins, the display reads image information from FB7 for display. In a still next refresh period, image information from FB3 is read for display.

As described above, when the terminal device stores image information, time information is also stored. Therefore, when the display component enters a new refresh period, the terminal device may acquire latest stored image information according to the time information and send the image information to the display component for display.

There is no order between steps 300 and 301 during actual implementation. Step 300 may be first performed, or step 301 may be first performed, or steps 300 and 301 are performed simultaneously, which is not limited in this embodiment of the present disclosure.

For example, touch components on currently used terminal devices are mostly touchscreens, and when a user draws an arc on a touchscreen, used as a touch component, of a terminal device using a finger, the touchscreen may report to a central processing unit (CPU) of the terminal device, in each report period, one piece of sensing information used to indicate a current contact point of the finger on the touchscreen. However, in actual application, the user usually continually performs a slide operation of multiple report periods on the touchscreen. To acquire and use all sensing information reported by the touchscreen when the user performs the slide operation, a processor may set a sampling period to be less than a refresh period of a display component, thereby ensuring that an image processing program in the terminal device can use sensing information as a slide track of the user as much as possible. However, in the prior art except the present disclosure, as shown in FIG. 4, some sensing information in a previous refresh period is selected for display, only sensing information corresponding to solid contact points can be displayed, and sensing information corresponding to hollow contact points can only be discarded, thereby causing distortion of image information (as shown by dashed lines); or one piece of sample information is obtained from multiple pieces of sensing information using an average value, which is quite different from actual sensing information.

Therefore, in the touch input method provided in this embodiment of the present disclosure, sensing information can be sampled at a frequency higher than a refresh frequency of a display component, such that the sensing information is used as much as possible, and therefore an obtained track is closer to an actual touch track.

In the foregoing two method embodiments, a set of coordinate information may also be stored instead of image information provided that during display, image information needs to be generated according to the set of coordinate information for display.

Figure 7:
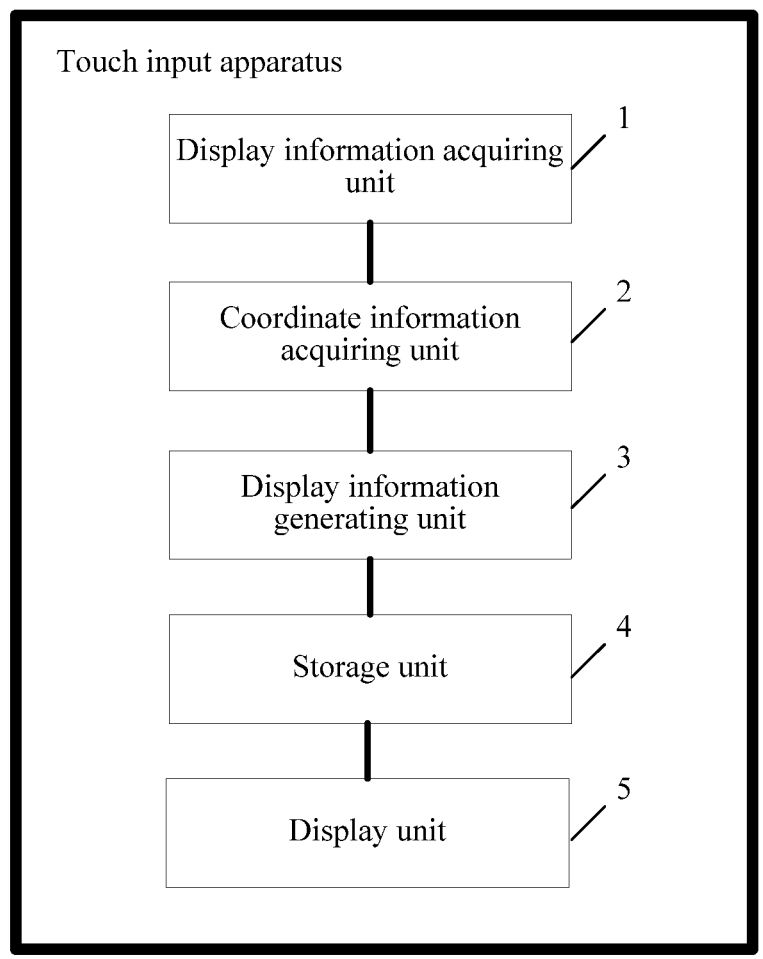
FIG. 7 is a schematic diagram of a structure of a touch input apparatus according to an embodiment of the present disclosure.

As shown in FIG. 7, an embodiment of the present disclosure provides a touch input apparatus, including the following components.

A display information acquiring unit 1 is configured to read an $(N-1)^{th}$ piece of display information from a memory, where N is an integer greater than or equal to 2.

A first piece of display information is generated according to a first piece of coordinate information, and may be the first piece of coordinate information, or image information generated using the first piece of coordinate information. The first piece of coordinate information is acquired in a first coordinate acquiring period, and the coordinate information is used to indicate location information of a user touch sensed by a touch component. The $(N-1)^{th}$ piece of display information read from the memory may be a set of the first piece of coordinate information to an $(N-1)^{th}$ piece of coordinate information, or may be an $(N-1)^{th}$ piece of image information generated using the first piece of coordinate information to an $(N-1)^{th}$ piece of coordinate information.

A coordinate information acquiring unit 2 is configured to acquire an $N^{th}$ piece of coordinate information in an $N^{th}$ coordinate acquiring period, where the coordinate information is used to indicate location information, of a user touch, sensed by the touch component, and the coordinate acquiring period is less than a refresh period of a display component.

The coordinate acquiring period may be a report period of the touch component, or may be a sampling period in which sensing information reported by the touch component is sampled. Correspondingly, the coordinate information may be the sensing information reported by the touch component, or sample information obtained by sampling the sensing information reported by the touch component.

A display information generating unit 3 is configured to generate, using the $(N-1)^{th}$ piece of display information and the $N^{th}$ piece of coordinate information, an $N^{th}$ piece of display information corresponding to the $N^{th}$ coordinate acquiring period.

More specifically, it may be that a set of the first piece of coordinate information to the $N^{th}$ piece of coordinate information is generated using the $N^{th}$ piece of coordinate information and the set of the first piece of coordinate information to the $(N-1)^{th}$ piece of coordinate information; or it may be that an $N^{th}$ piece of image information is generated using the $(N-1)^{th}$ piece of image information and the $N^{th}$ piece of coordinate information. It may also be that an $N^{th}$ piece of image information is generated using the $N^{th}$ piece of coordinate information and the set of the first piece of coordinate information to the $(N-1)^{th}$ piece of coordinate information.

A storage unit 4 is configured to store the $N^{th}$ piece of display information in the memory. During storage, a set of coordinate information may be stored using an array or the like. Further, the $N^{th}$ piece of display information and time information corresponding to the $N^{th}$ piece of display information may be stored in the memory.

A display unit 5 is configured to, when the display component is refreshed, display, using the display component, latest display information stored in the memory. If the display information is a set of coordinate information, image information is generated according to a set of latest coordinate information stored in the memory, and the image information is displayed using the display component.

If the display information is image information, latest image information stored in the memory is displayed using the display component.

More specifically, it may be that the latest display information stored in the memory is acquired according to the time information, and the latest display information stored in the memory is displayed using the display component.

The touch input apparatus provided in this embodiment of the present disclosure can execute the method shown in FIG. 1.

During implementation, the coordinate acquiring period may be a report period of the touch component, and the coordinate information is the sensing information reported by the touch component. A touch input apparatus provided in an embodiment of the present disclosure includes a display information acquiring unit 1 configured to read an $(N-1)^{th}$ piece of image information from a memory, where N is an integer greater than or equal to 2; a coordinate information acquiring unit 2 configured to acquire sensing information N that is reported by a touch component in an $N^{th}$ report period, where the sensing information N is used to indicate location information, of a user touch, sensed by the touch component, reported in the $N^{th}$ report period, of a user touch; a display information generating unit 3 configured to generate image information of the $N^{th}$ report period using the image information N−1 and the sensing information N; a storage unit 4 configured to store the image information of the $N^{th}$ report period in the memory; and a display unit 5 configured to, when a current refresh period of a display component begins, display, using the display component, latest image information stored in the memory.

Optionally, the memory includes multiple frame buffers, where one frame buffer is used to store image information of one report period. The storage unit 4 is configured to store the image information of the $N^{th}$ report period in one frame buffer of the memory.

Generally, a quantity of frame buffers may be set to 2*(a report rate of the touch component/a refresh frequency of an LCD), and if a quotient of the report rate of the touch component/the refresh frequency of the LCD is not an integer, the quantity of frame buffers may be set to 2*(a value obtained by rounding the report rate of the touch component/the refresh frequency of the LCD+1). The generated image information may be cyclically stored in the frame buffers. For example, when the quantity of frame buffers is set to 6, image information 1 is stored in a frame buffer 1, image information 2 is stored in a frame buffer 2, . . . , image information 6 is stored in a frame buffer 6, image information 7 is stored in the frame buffer 1, image information 8 is stored in the frame buffer 2, and so on.

It should be noted that, after a user ends a touch input operation, the user may clear image information stored in the memory or clear the frame buffers. When the user performs another touch input operation, a moment at which the touch component generates sensing information according to the other touch of the user on the touch component may be used as a start time of a new first report period. When no touch input operation of the user is received within a specified time, it may be determined that the user ends a current touch input operation. When the terminal device stores image information, time information is also stored. For example, an actual time at which the image information is generated or an actual time at which the image information is stored is stored together with the image information, or when the image information is stored in a first frame buffer, a latest identifier may be used to mark the first frame buffer as the latest, and when a next piece of image information is stored in a second frame buffer, the second frame buffer may be marked as the latest, and the latest identifier of the first frame buffer is removed. There may be many manners that enable the terminal device to learn which piece of image information is the latest stored.

The touch input apparatus provided in this embodiment of the present disclosure can execute the method shown in FIG. 2, where all sensing information reported by a touch component can be used, and corresponding image information is generated using all the sensing information and is stored, such that the generated image information can reflect the sensing information actually reported by the touch component, and when each refresh period of a display component begins, latest stored image information is displayed. This avoids the following problem in the prior art: an error exists in a track actually input by a user because sensing information in a refresh period is selected randomly, thereby improving accuracy of touch input.

In this embodiment, the memory may also store a set of sensing information, and correspondingly the display information acquiring unit 1 is configured to read a set of a first piece of sensing information to an $(N-1)^{th}$ piece of sensing information from the memory, where N is an integer greater than or equal to 2; the coordinate information acquiring unit 2 is configured to acquire sensing information N that is reported by the touch component in the $N^{th}$ report period, where the sensing information N is used to indicate the location information, of a user touch, sensed by the touch component, reported in the $N^{th}$ report period, of the user touch; the display information generating unit 3 is configured to generate a set of the first piece of sensing information to the $N^{th}$ piece of sensing information using the sensing information N and the set of the first piece of sensing information to the $(N-1)^{th}$ piece of sensing information; the storage unit 4 is configured to store the set of the first piece of sensing information to the $(N-1)^{n}$ piece of sensing information in the memory; and the display unit 5 is configured to, when the current refresh period of the display component begins, generate image information according to a set of latest stored sensing information, and display the image information using the display component.

The coordinate acquiring period may be a sampling period in which sensing information reported by the touch component is sampled, and the coordinate information may be sample information obtained by sampling the sensing information reported by the touch component. A touch input apparatus provided in an embodiment of the present disclosure includes the following components.

A display information acquiring unit 1 is configured to read an $(L-1)^{th}$ piece of image information from a memory, where L is an integer greater than or equal to 2.

A coordinate information acquiring unit 2 is configured to acquire an $L^{th}$ piece of sample information in an $L^{th}$ sampling period according to sensing information reported by a touch component, where the sampling period is less than a refresh period of a display component, and optionally, the refresh period of the display component may be an integer multiple of the sampling period. In this way, a relatively smooth track may be displayed. The sampling period=1/a sampling frequency, and the refresh period of the display component=1/a refresh frequency of the display component. Optionally, the refresh period of the display component may be an integer multiple of the sampling period; one refresh period of the display component may be synchronous with one sampling period, and during implementation, they may also not be synchronous.

A display information generating unit 3 is configured to generate image information of the $L^{th}$ sampling period using the $(L-1)^{th}$ image information and the sample information that is acquired in the $L^{th}$ sampling period.

A storage unit 4 is configured to store the image information of the $L^{th}$ sampling period in the memory.

A display unit 5 is configured to, when a current refresh period of the display component begins, display, using the display component, latest image information stored in the memory.

Optionally, the memory includes multiple frame buffers, where one frame buffer is used to store sample information corresponding to one sampling period. The storage unit 4 is configured to store the image information of the $L^{th}$ sampling period in one frame buffer of the memory.

Generally, a quantity of frame buffers may be set to 2*(the sampling frequency/a refresh frequency of an LCD), and if a quotient of the sampling frequency/the refresh frequency of the LCD is not an integer, the quantity of frame buffers may be set to 2*(a value obtained by rounding the sampling frequency/the refresh frequency of the LCD+1). The generated image information may be cyclically stored in the frame buffers. For example, when the quantity of frame buffers is set to 6, image information 1 is stored in a frame buffer 1, image information 2 is stored in a frame buffer 2, . . . , image information 6 is stored in a frame buffer 6, image information 7 is stored in the frame buffer 1, image information 8 is stored in the frame buffer 2, and so on.

It should be noted that, after a user ends a touch input operation, the user may clear image information stored in the memory or clear the frame buffers.

When the terminal device stores image information, time information is also stored. For example, an actual time at which the image information is generated or an actual time at which the image information is stored is stored together with the image information, or when the image information is stored in a first frame buffer, a latest identifier may be used to mark the first frame buffer as the latest, and when a next piece of image information is stored in a second frame buffer, the second frame buffer may be marked as the latest, and the latest identifier of the first frame buffer is removed. There may be many manners that enable the terminal device to learn which piece of image information is the latest stored.

The touch input apparatus provided in this embodiment of the present disclosure can execute the method shown in FIG. 6, where sensing information can be sampled at a frequency higher than a refresh frequency of a display component, such that the sensing information is used as much as possible, and therefore an obtained track is closer to an actual touch track.

In this embodiment, the memory may also store a set of sample information, and correspondingly the display information acquiring unit 1 is configured to read a set of a first piece of sample information to an $(L-1)^{th}$ piece of sample information from the memory, where L is an integer greater than or equal to 2; the coordinate information acquiring unit 2 is configured to acquire an $L^{th}$ piece of sample information in an $L^{th}$ sampling period according to sensing information reported by the touch component; display information generating unit 3 is configured to generate a set of the first piece of sample information to the $L^{th}$ piece of sample information using the sample information that is acquired in the $L^{th}$ sampling period and the set of the first piece of sample information to the $(L-1)^{th}$ piece of sample information; the storage unit 4 is configured to store the set of the first piece of sample information to the $L^{th}$ piece of sample information in the memory; and the display unit 5 is configured to, when the current refresh period of the display component begins, generate image information according to a set of latest stored sample information, and display the image information using the display component.

Figure 8:
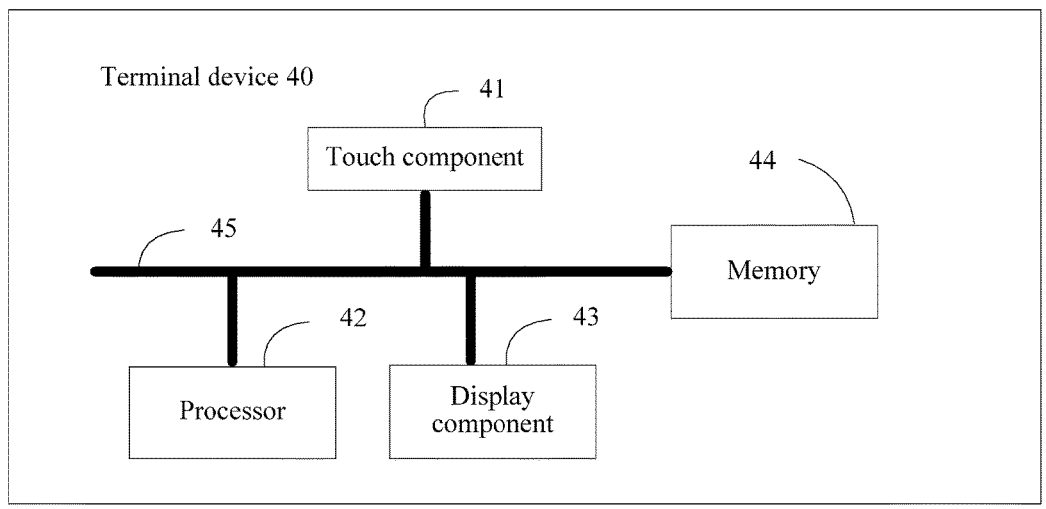
FIG. 8 is a schematic diagram of a structure of a terminal device according to an embodiment of the present disclosure.

An embodiment of the present disclosure further provides a terminal device 40. As shown in FIG. 8, the terminal device 40 includes at least a touch component 41, such as a touch panel, or a touch layer in a touch display screen; at least one processor 42, such as a CPU; at least one display component 43, such as an LCD; a memory 44; and at least one communications bus 45. The communications bus 45 is configured to implement connection and communication between these components. The memory 44 may include a magnetic disk, an optical disc, a read-only memory (ROM), a random access memory (RAM), or the like. In some implementation manners, the memory 44 may store the following elements: program code (such as an operation system, including various system programs, used to implement various basic services and process a hardware-based task, and application programs, including various application programs, used to implement various application services) and data.

The touch component 41 is configured to report sensing information N in an $N^{th}$ report period, where N is an integer greater than or equal to 2, and the sensing information N is used to indicate location information, of a user touch, sensed by the touch component, reported in the $N^{th}$ report period, of a user touch.

The processor 42 is configured to read an $(N-1)^{th}$ piece of display information from the memory; acquire an $N^{th}$ piece of coordinate information in an $N^{th}$ coordinate acquiring period, generate, using the $(N-1)^{th}$ piece of display information and the $N^{th}$ piece of coordinate information, an $N^{th}$ piece of display information corresponding to the $N^{th}$ coordinate acquiring period, and store the $N^{th}$ piece of display information in the memory; and when the display component is refreshed, display, using the display component, latest display information stored in the memory.

The coordinate information is used to indicate location information, of the user touch, sensed by the touch component. The coordinate acquiring period is less than a refresh period of the display component. The coordinate acquiring period may be a report period of the touch component, or may be a sampling period in which sensing information reported by the touch component is sampled. Correspondingly, the coordinate information may be the sensing information reported by the touch component, or sample information obtained by sampling the sensing information reported by the touch component.

More specifically, it may be that a set of a first piece of coordinate information to the $N^{th}$ piece of coordinate information is generated using the $N^{th}$ piece of coordinate information and a set of the first piece of coordinate information to an $(N-1)^{th}$ piece of coordinate information; or it may be that an $N^{th}$ piece of image information is generated using an $(N-1)^{th}$ piece of image information and the $N^{th}$ piece of coordinate information. It may also be that an $N^{th}$ piece of image information is generated using the $N^{th}$ piece of coordinate information and the set of the first piece of coordinate information to the $(N-1)^{th}$ piece of coordinate information.

During storage, a set of coordinate information may be stored using an array or the like. Further, the $N^{th}$ piece of display information and time information corresponding to the $N^{th}$ piece of display information may be stored in the memory.

If the display information is a set of coordinate information, image information is generated according to a set of latest coordinate information stored in the memory, and the image information is displayed using the display component.

If the display information is image information, latest image information stored in the memory is displayed using the display component.

It may be that the latest display information stored in the memory is acquired according to the time information, and the latest display information stored in the memory is displayed using the display component.

The display component 43 is configured to, when a current refresh period begins, display the latest display information stored in the memory.

The memory 44 is configured to store the display information obtained by the processor 42 by means of processing.

Multiple frame buffers may be set in the memory 44, where one frame buffer stores display information of one coordinate acquiring period.

The terminal device provided in this embodiment of the present disclosure can implement the methods shown FIG. 1, FIG. 2 or FIG. 5, where sensing information can be used at a frequency higher than a refresh frequency of a display component, such that the sensing information is used as much as possible, and therefore an obtained track is closer to an actual touch track.

The embodiments in this specification are all described in a progressive manner, for same or similar parts in the embodiments, reference may be made to these embodiments, and each embodiment focuses on a difference from other embodiments. Especially, a device embodiment is basically similar to a method embodiment, and therefore is described briefly; for related parts, reference may be made to partial descriptions in the method embodiment.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The foregoing storage medium may include a magnetic disk, an optical disc, a ROM, a RAM, or the like.

The foregoing descriptions are merely implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A touch input method, applied to a terminal device, wherein the terminal device comprises at least a touch component, a display component, and a memory, and wherein the method comprises:

reading an $(N-1)^{th}$ piece of display information from the memory, wherein N is an integer greater than or equal to 2;

acquiring an $N^{th}$ piece of coordinate information in an $N^{th}$ coordinate acquiring period, wherein the coordinate information is used to indicate location information, of a user touch, sensed by the touch component, and wherein the coordinate acquiring period is less than a refresh period of the display component;

generating, using the $(N-1)^{th}$ piece of display information and the $N^{th}$ piece of coordinate information, an $N^{th}$ piece of display information corresponding to the $N^{th}$ coordinate acquiring period;

storing the $N^{th}$ piece of display information and time information corresponding to the $N^{th}$ piece of display information in the memory;

acquiring latest display information according to the time information; and displaying, using the display component, the latest display information stored in the memory when the display component is refreshed, and wherein multiple frame buffers are set in the memory, wherein the $N^{th}$ piece of display information and the time information are stored in the multiple frame buffers, wherein a quantity of the multiple frame buffers is based on a report rate of the touch component and a refresh frequency of the display component, the refresh frequency is a reciprocal of the refresh period, wherein the quantity of the multiple frame buffers is determined by multiplying two times the quotient of the report rate of the touch component divided by the refresh frequency of the display component when the quotient of the report rate of the touch component divided by the refresh frequency of the display component is an integer, and wherein the quantity of the multiple frame buffers is determined by rounding the quotient of the report rate of the touch component divided by the refresh frequency of the display component to obtain a rounded quotient and multiplying two times the sum of the rounded quotient and one when the quotient of the report rate of the touch component divided by the refresh frequency of the display component is not the integer.

2. The touch input method according to claim 1, wherein the $(N-1)^{th}$ piece of display information is a set of a first piece of coordinate information to an $(N-1)^{th}$ piece of coordinate information, and the $N^{th}$ piece of display information is a set of the first piece of coordinate information to the $N^{th}$ piece of coordinate information, wherein generating, using the $(N-1)^{th}$ piece of display information and the $N^{th}$ piece of coordinate information, the $N^{th}$ piece of display information corresponding to the $N^{th}$ coordinate acquiring period includes generating the set of the first piece of coordinate information to the $N^{th}$ piece of coordinate information using the $N^{th}$ piece of coordinate information and the set of the first piece of coordinate information to the $(N-1)^{th}$ piece of coordinate information, and wherein displaying, using the display component, latest display information stored in the memory includes generating image information according to a set of latest coordinate information stored in the memory, and displaying the image information using the display component.

3. The touch input method according to claim 1, wherein the $(N-1)^{th}$ piece of display information is an $(N-1)^{th}$ piece of image information, and the $N^{th}$ piece of display information is an $N^{th}$ piece of image information, wherein generating, using the $(N-1)^{th}$ piece of display information and the $N^{th}$ piece of coordinate information, the $N^{th}$ piece of display information corresponding to the $N^{th}$ coordinate acquiring period, and storing the $N^{th}$ piece of display information in the memory includes generating the $N^{th}$ piece of image information using the $(N-1)^{th}$ piece of image information and the $N^{th}$ piece of coordinate information, and wherein displaying, using the display component, latest display information stored in the memory includes displaying, using the display component, latest image information stored in the memory.

4. The touch input method according to claim 1, wherein the coordinate acquiring period is a report period of the touch component, wherein the coordinate information is sensing information reported by the touch component, and wherein acquiring the $N^{th}$ piece of coordinate information in the $N^{th}$ coordinate acquiring period includes acquiring sensing information N that is reported by the touch component in an $N^{th}$ report period.

5. The touch input method according to claim 1, wherein the coordinate acquiring period is a sampling period in which sensing information reported by the touch component is sampled, wherein the coordinate information is sample information obtained by sampling the sensing information reported by the touch component, and wherein acquiring the $N^{th}$ piece of coordinate information in the $N^{th}$ coordinate acquiring period includes acquiring an $N^{th}$ piece of sample information in an $N^{th}$ sampling period according to sensing information reported by the touch component.

6. The touch input method according to claim 5, wherein the refresh period of the display component is an integer multiple of the sampling period.

7. The touch input method according to claim 1, wherein the multiple frame buffers are cyclically stored in the memory and are cleared after the user touch.

8. The touch input method according to claim 7, wherein a new report period is started when the at least one touch component senses another user touch.

9. A terminal device, comprising:
a touch component;
a display component;
a processor; and
a memory configured to store N pieces of display information, wherein N is an integer greater than or equal to 2,
wherein the touch component, the display component, the processor, and the memory are coupled together using a communications bus,
wherein the processor is configured to:
read an $(N-1)^{th}$ piece of display information from the memory;
acquire an $N^{th}$ piece of coordinate information in an $N^{th}$ coordinate acquiring period, wherein the coordinate information is used to indicate location information, of a user touch, sensed by the touch component, and wherein the coordinate acquiring period is less than a refresh period of the display component;
generate, using the $(N-1)^{th}$ piece of display information and the $N^{th}$ piece of coordinate information, an $N^{th}$ piece of display information corresponding to the $N^{th}$ coordinate acquiring period;
store the $N^{th}$ piece of display information and time information corresponding to the $N^{th}$ piece of display information in the memory;
acquire latest display information according to the time information; and
display, using the display component, the latest display information stored in the memory when the display component is refreshed,
wherein the touch component is configured to sense the location information of the user touch,
wherein the memory is configured to store the $N^{th}$ piece of display information in the memory,
wherein the display component is configured to display latest display information stored in the memory when a current refresh period begins,
wherein multiple frame buffers are set in the memory,
wherein the $N^{th}$ piece of display information and the time information are stored in the multiple frame buffers,
wherein a quantity of the multiple frame buffers is based on a report rate of the touch component and a refresh frequency of the display component, the refresh frequency is a reciprocal of the refresh period,
wherein the quantity of the multiple frame buffers is determined by multiplying two times the quotient of the report rate of the touch component divided by the refresh frequency of the display component when the quotient of the report rate of the touch component divided by the refresh frequency of the display component is an integer, and
wherein the quantity of the multiple frame buffers is determined by rounding the quotient of the report rate of the touch component divided by the refresh frequency of the display component to obtain a rounded quotient and multiplying two times the sum of the rounded quotient and one when the quotient of the report rate of the touch component divided by the refresh frequency of the display component is not the integer.

10. The terminal device according to claim 9, wherein the $(N-1)^{th}$ piece of display information is a set of a first piece of coordinate information to an $(N-1)^{th}$ piece of coordinate information, and the $N^{th}$ piece of display information is a set of the first piece of coordinate information to the $N^{th}$ piece of coordinate information, wherein generating, using the $(N-1)^{th}$ piece of display information and the $N^{th}$ piece of coordinate information, the $N^{th}$ piece of display information corresponding to the $N^{th}$ coordinate acquiring period includes generating the set of the first piece of coordinate information to the $N^{th}$ piece of coordinate information using the $N^{th}$ piece of coordinate information and the set of the first piece of coordinate information to the $(N-1)^{th}$ piece of coordinate information, and wherein displaying, using the display component, latest display information stored in the memory includes generating image information according to a set of latest coordinate information stored in the memory, and displaying the image information using the display component.

11. The terminal device according to claim 9, wherein the $(N-1)^{th}$ piece of display information is an $(N-1)^{th}$ piece of image information, and the $N^{th}$ piece of display information is an $N^{th}$ piece of image information, wherein generating, using the (N−1) piece of display information and the $N^{th}$ piece of coordinate information, the $N^{th}$ piece of display information corresponding to the $N^{th}$ coordinate acquiring period and storing the $N^{th}$ piece of display information in the memory includes generating the $N^{th}$ piece of image information using the $(N-1)^{th}$ piece of image information and the $N^{th}$ piece of coordinate information, and wherein displaying, using the display component, latest display information stored in the memory includes displaying, using the display component, latest image information stored in the memory.

12. The terminal device according to claim 9, wherein the coordinate acquiring period is a report period of the touch component, wherein the coordinate information is sensing information reported by the touch component, and wherein acquiring the $N^{th}$ piece of coordinate information in the $N^{th}$ coordinate acquiring period includes acquiring sensing information N that is reported by the touch component in an $N^{th}$ report period.

13. The terminal device according to claim 9, wherein the coordinate acquiring period is a sampling period in which sensing information reported by the touch component is sampled, wherein the coordinate information is sample information obtained by sampling the sensing information reported by the touch component, and wherein acquiring the $N^{th}$ piece of coordinate information in the $N^{th}$ coordinate acquiring period includes acquiring an $N^{th}$ piece of sample information in an $N^{th}$ sampling period according to sensing information reported by the touch component.

14. The terminal device according to claim 13, wherein the refresh period of the display component is an integer multiple of the sampling period.

15. The terminal device according to claim 9, wherein the time information comprises an actual time at which the $N^{th}$ piece of display information is generated.

16. The terminal device according to claim 9, wherein the time information comprises an actual time at which the $N^{th}$ piece of display information is stored.

17. The terminal device according to claim 9, wherein the multiple frame buffers are cyclically stored in the memory and are cleared after the user touch.

18. The terminal device according to claim 17, wherein a new report period is started when the at least one touch component senses another user touch.

\* \* \* \* \*

UNITED STATES PATENT AND TRADEMARK OFFICE
CERTIFICATE OF CORRECTION

PATENT NO. : 10,019,087 B2
APPLICATION NO. : 14/980586
DATED : July 10, 2018
INVENTOR(S) : Lei Chen It is certified that error appears in the above-identified patent and that said Letters Patent is hereby corrected as shown below:

On the Title Page

Item (30), Line 1: "201310557225" should be "201310557225.2"

In the Claims

Column 23, Line 1 Claim 11: "(N - 1)" should be "(N - 1)$^{th}$"

Signed and Sealed this
Twenty-eighth Day of August, 2018

Andrei Iancu
*Director of the United States Patent and Trademark Office*